(12) United States Patent
Hordvik et al.

(10) Patent No.: US 6,343,173 B2
(45) Date of Patent: *Jan. 29, 2002

(54) GOLD COATED SIGNAL CABLE

(75) Inventors: Audun Hordvik; Morten Eriksrud, both of Trondheim (NO)

(73) Assignee: Optoplan AS, Trondheim (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,138

(22) Filed: Jul. 13, 1999

(51) Int. Cl.$^7$ .................................................. G02B 6/44
(52) U.S. Cl. ....................................... 385/102; 385/109
(58) Field of Search ................................ 385/102, 100, 385/127, 128, 109–114

(56) References Cited

U.S. PATENT DOCUMENTS

| | | | | |
|---|---|---|---|---|
| 4,407,561 A | * | 10/1983 | Wysocki | 385/128 |
| 4,784,461 A | * | 11/1988 | Abe et al. | 385/102 |
| 4,822,133 A | * | 4/1989 | Peacock | 385/109 |
| 5,093,880 A | * | 3/1992 | Matsuda et al. | 385/100 |
| 5,135,295 A | * | 8/1992 | Jen et al. | 385/13 |
| 5,329,606 A | * | 7/1994 | Andreassen | 385/109 |
| 5,497,442 A | * | 3/1996 | Roos et al. | 385/128 |
| 5,774,615 A | * | 6/1998 | Uda et al. | 385/128 |
| 5,812,724 A | * | 9/1998 | Ohtsu et al. | 385/128 |

* cited by examiner

*Primary Examiner*—Ellen E. Kim
(74) *Attorney, Agent, or Firm*—Dennison, Scheiner & Schultz

(57) ABSTRACT

Signal cable for transmission of optical signals, especially in oil and gas wells, includes at least one elongated optical fiber, and an elongated, generally tubular container within which the optical fiber is disposed, the container having an inner wall and an outer wall, a space being defined between the optical fiber and the inner wall. At least one of the inner wall and the outer wall has a thin continuous surface coating of gold or a gold alloy.

10 Claims, 1 Drawing Sheet

GOLD COATED SIGNAL CABLE

FIELD OF THE INVENTION

The invention relates to a signal cable for transmission of optical signals in oil and gas wells.

DESCRIPTION OF RELATED ART

Signal cables are i.a. used in oil and gas wells for measurement of such parameters as pressure, temperature, tension, flow, and for fibre optic communication. The cables may have a length of 6 km or more for use in wells, and should tolerate temperatures of 200° C. and pressure over 1000 bar. In addition, the cables are vulnerable to corrosion because they are usually located in the liquid filled annulus between the casing and the tubing.

NO patent-publication 175119 describes a cable for this application, where the fibre is inside a steel tube which protects it from the hydrostatic pressure which normally will be several hundred bar. The tube is stranded around a centre element, and the fibre is able to move sidewise in the tube so that some elongation of the cable due to thermal expansion and/or mechanical tension, is possible without straining the fibre.

For submarine cables, it is known that as a result of corrosion of, or at, the metal-containing cable, hydrogen is produced. The hydrogen diffuses into the optical fibre and results in attenuation of the light being transmitted.

The attenuation can be permanent or reversible. Permanent losses are a result of a reaction between the hydrogen which diffuses into the optical fibre, and the silica glass, and the loss will generally increase with the hydrogen concentration, and with time. Reversible losses are the results of hydrogen molecules which diffuse into the optical fibre, but does not combine with the glass. The latter loss is proportional with the concentration of hydrogen.

Representative partial pressures of hydrogen in submarine cables are about 1 bar. For submarine cables, one has tried to solve this problem by, for example, placing the optical fibre cable inside a copper tube in order to establish a barrier against diffusion of hydrogen into the optical fibre.

In oil and gas wells it has surprisingly been found that considerable amounts of hydrogen are developed in the area outside and on the cable. Because of the high temperature prevailing in such wells, normally 100–200° C., the hydrogen will quickly penetrate into a steel tube which encapsulates the fibre, and diffuse into the optical fibre and cause losses. The partial pressure of hydrogen inside the pipe can be up to 100 bar. Even at much lower hydrogen pressures, the loss in the fibre will normally be so high that the cable is no longer usable for the intended purpose.

The use of copper in such applications is, however, not practical, because of the high hydrostatic pressure to which the cable is exposed. Copper will further not be a particularly effective barrier against hydrogen at the high temperatures of interest.

SUMMARY OF THE INVENTION

One object of the invention is to provide a signal cable for transmission of optical signals in oil and gas wells, said cable preventing or reducing the penetration of hydrogen into the fibre material.

Another object of the invention is to provide such a device which also reduces the formation of hydrogen in the area around the fibre optical cable in oil/ gas wells.

The invention relates to a signal cable for transmission of optical signals in oil and gas wells, said cable comprising one or more optical fibres encapsulated in at the least one pressure and temperature resistant hollow and normally tube- or channel-shaped protection means, optionally placed by or integrated with a cable-construction, for example as described in NO patent publication 175119.

According to the invention, the protection means is provided by a thin continuous surface coating of gold, or a gold-alloy which mainly comprises gold.

According to the invention the surprising technical effect resulting from this new gold coating on fibre optic signal cables is firstly that the gold coating passivates the metal in the cover means resulting in a strong reduction in the formation of hydrogen on the surface of the cover means. Secondly, the solubility of hydrogen in gold is very low, and therefore the permeability rate for hydrogen in gold is very low. With a goldcoating on the cover means, for example a steel tube, with a few micrometers thickness, for example 1–10 $\mu$m, it is therefore possible to achieve a satisfactory and lasting signal transmission in the fibre optical cable for a period for several years, even with ambient hydrostatic pressure of several hundred bar, ambient temperature around 200° C., and in corrosive environments.

Gold coating with such thickness can be established at the cover means with known methods, such as electroplating, on tube-lengths of several kilometers.

The gold coating is preferably provided at the exterior surface of the cover means, both in order to passivate the cover material, and to establish a diffusion barrier against hydrogen. The gold coating may however, as an alternative or in addition, also be provided at the interior surface of the cover means, to establish a diffusion barrier against hydrogen.

The signal cable according to the invention, may further comprise several cover means which encapsulate each other, for example concentric pipes or channels of steel, and one or more of the said surfaces of the concentric placed cover means, may be provided with gold coating. It is preferably the exterior surface of the cover means which is provided with a gold coating. This produces both a passivating effect and a barrier. A gold coating on the interior surface will only produce a barrier effect and besides be harder to apply than an exterior coating.

The gold coated signal cable according to the invention, may be used in different cable constructions, for example, the one described in NO patent-publication 175119. In order to protect the gold coating on the signal cable according to the invention, during production, installation and operation, it would be advantageous to provide a thin protecting layer on the outside of the cover means, for example of a temperature resistant plastic, before the gold coated signal cable enters into the production process for the composite cable. Examples of applicable plastics are polyether keton (PEEK), perfluor alkoxy (PFA) and teflon.

A plastic coating as described above, provided on the exterior surface of the cover means or at the exterior surface of the outermost cover means, may also have a passivating effect on the surface of the cover means and reduce local production of hydrogen.

The thickness of the gold coating can be selected considering the range of use and signal cable construction. Multiple gold coatings demand less thickness per coating, and lower pressure/ temperature in the surroundings also demands less thickness. Normally, the thickness of the coating should not be less than 2–3 micrometers in order to achieve a coating without pores. In the example below it is given an example of a calculation with a 3 micrometers thickness of the coating.

BRIEF DESCRIPTION OF THE DRAWINGS

In the enclosed drawings there are shown schematic embodiments of the invention, where.

DESCRIPTION OF THE PREFERRED EMBODIMENTS

Figure 1:
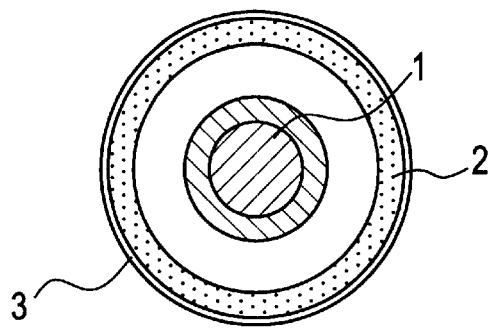
FIG. 1 shows a schematic cross section of a first embodiment of a signal cable according to the invention.

FIG. 1 shows an optical fibre 1 in a tube-shaped cover means 2. The exterior surface of the cover means 2, er provided with a thin coating 3 of gold.

Figure 2:
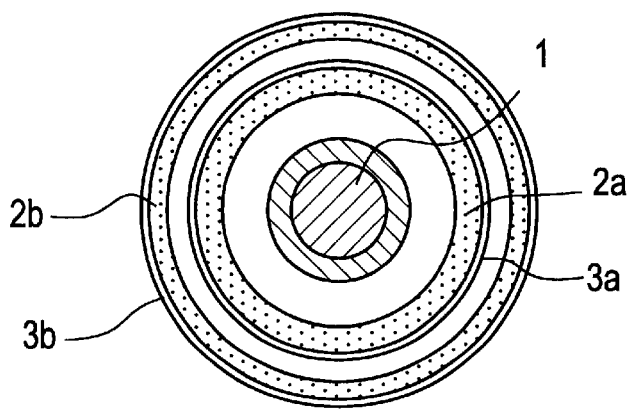
FIG. 2 shows a cross section corresponding to FIG. 1, of a second embodiment.

FIG. 2 shows another embodiment where the optical fibre 1 is in a first tube-shaped cover means 2a, which again is encapsulated in a generally concentric second tube-shaped cover means 2b. In this embodiment both the exterior surfaces of the cover means 2a and 2b are provided with a gold coating 3a and 3b.

Figure 3:
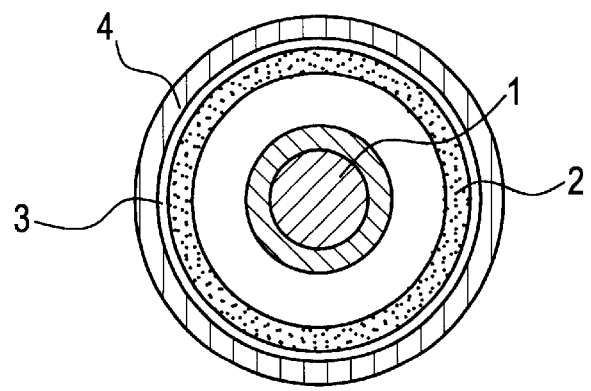
FIG. 3 shows a cross section corresponding to FIG. 1, of a third embodiment.

FIG. 3 shows a third embodiment where the optical fibre 1 is in a tube-shaped cover means 2. The exterior surface of the cover means 2 is in this embodiment covered with a gold coating 3 and a plastic coating 4 in order to give the gold coating a mechanical protection.

EXAMPLE

This calculation example is put forward in order to illustrate the barrier effect of gold, with a coating thickness of 3 micrometers as a function of temperature and time, in comparison with an unprotected steel tube.

The table which is given below, presents the calculation results for an unprotected steel tube (Inconel 625) and a steel tube provided with a 3 micrometers thick gold coating after 1 and 5 years, at a partial pressure of hydrogen at 1 and 100 atmospheres at 100 and 200° C. It is assumed that the steel tube has an outer diameter of 1.8 mm, and an inner diameter of 1.4 mm. These are realistic dimensions for most applications. The hydrogen permeability for gold is about $1 \cdot 10^{-4} \exp(-15840/T)$mol/cm sec. $\sqrt{atm}$. The hydrogen permeability for Inconel 625 is about $8.16 \cdot 10^{-7} \exp(-7232/T)$mol/cm sec. $\sqrt{atm}$. T is the absolute temperature in K.

TABLE 1

Calculated pressure of hydrogen in a steel tube with and without a 3 $\mu$m thick gold coating.

| Temp | Outer pressure | Pressure inside tube without coating | | Pressure inside tube with Au-coating | |
|---|---|---|---|---|---|
| | | 1 year | 5 year | 1 year | 5 year |
| 170° C. | 1 atm | 1 atm | 1 atm | $4 \cdot 10^3$ atm | $2 \cdot 10^2$ atm |
| 170° C. | 100 atm | 100 atm | 100 atm | $4 \cdot 10^2$ atm | $2 \cdot 10^1$ atm |
| 200° C. | 1 atm | 1 atm | 1 atm | $4 \cdot 10^2$ atm | 0.18 atm |
| 200° C. | 100 atm | 100 atm | 100 atm | 0.43 atm | 2.0 atm |

As can be seen from the table, a gold-coating of 3 $\mu$m produces a substantial reduction of the hydrogen pressure surrounding the optical fibre inside the steel-tube, even after 5 years. Without the gold coating the pressure inside the tube, will approach the outer pressure after only a few days.

The invention thus provides an improved signal cable which makes it possible to transmit optical signals during a longer time period without substantial loss of signals, in oil and gas wells under high pressure and temperature and in surroundings with high partial pressure of hydrogen.

What is claimed is:

1. Signal cable for transmission of optical signals, comprising:
    at least one elongated optical fiber; and
    an elongated, generally tubular container within which the optical fiber is disposed, the container having an inner wall and an outer wall, an empty space being defined between the optical fiber and the inner wall;
    at least one of the inner wall and the outer wall comprising a thin continuous surface coating of gold or a gold alloy consisting essentially of gold.

2. Signal cable according to claim 1, wherein the container is a metal container.

3. Signal cable according to claim 2, wherein the container is a steel container.

4. Signal cable according to claim 1, wherein at least the outer wall comprises said coating.

5. Signal cable according to claim 4, wherein the coating is overcoated with a temperature resistant plastic.

6. Signal cable according to claim 1, wherein the coating is about 1–10 $\mu$m thick.

7. Signal cable according to claim 6, wherein the coating is about 3 $\mu$m thick.

8. Signal cable according to claim 1, wherein the outer wall is overcoated with a temperature resistant plastic.

9. Signal cable according to claim 1, additionally comprising at least one further generally tubular container disposed around said outer wall, a space being defined between the further container and the outer wall.

10. Signal cable according to claim 9, wherein the further container is externally coated with a temperature resistant plastic.

* * * * *